Sept. 18, 1945.   R. N. JANEWAY   2,384,925
VEHICLE SUSPENSION
Filed Aug. 1, 1942
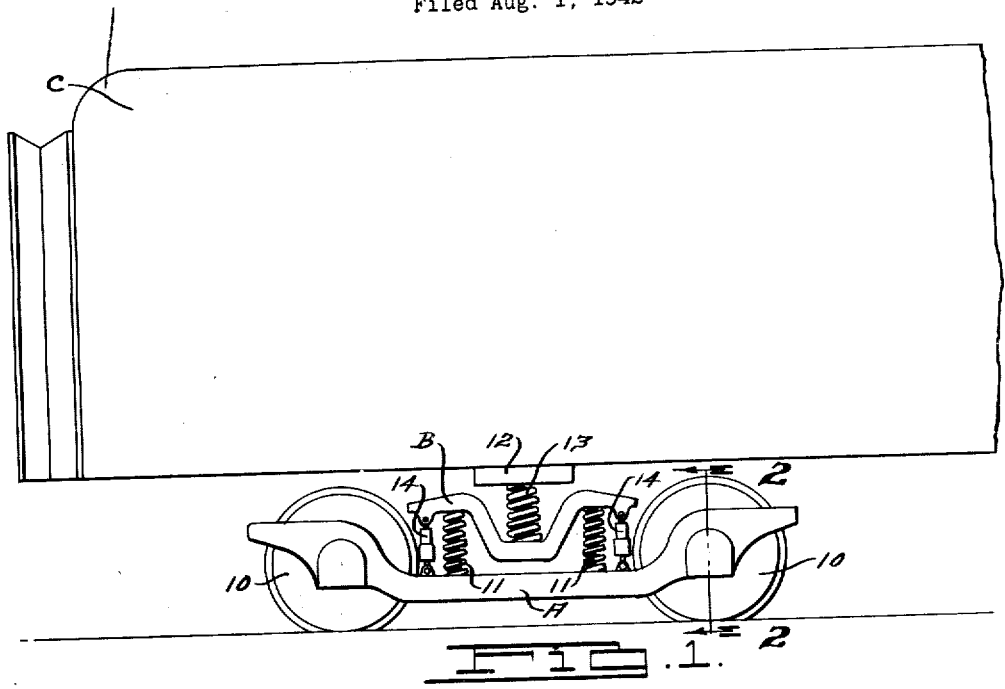
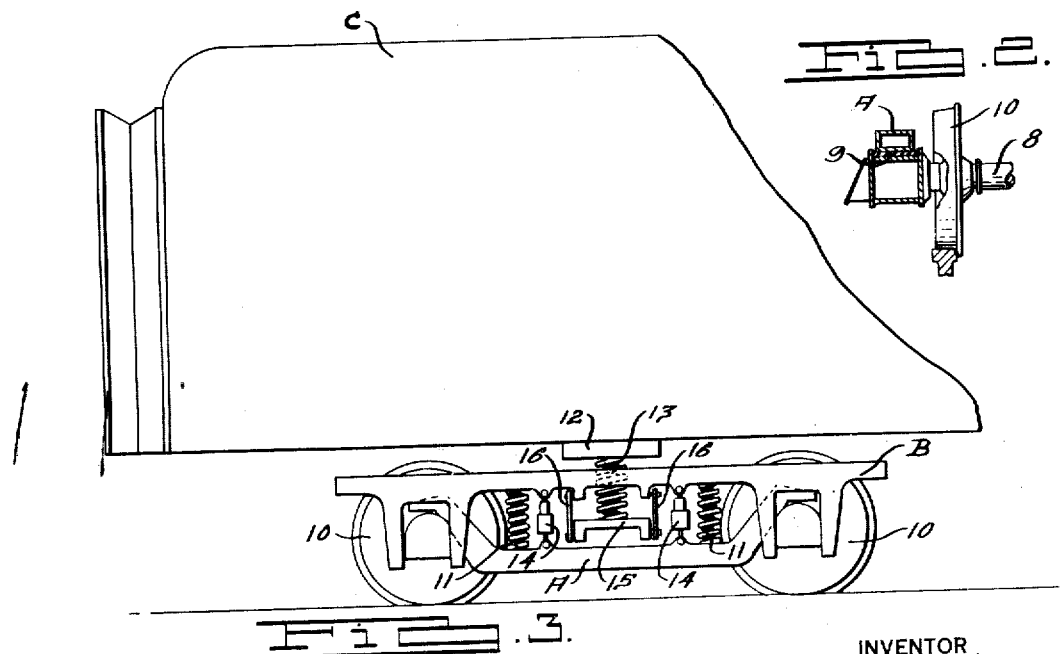
INVENTOR
Robert N. Janeway
BY
ATTORNEYS Patented Sept. 18, 1945

2,384,925

UNITED STATES PATENT OFFICE 2,384,925

VEHICLE SUSPENSION

Robert N. Janeway, Detroit, Mich., assignor to Railroad Rolling Stock Patents Corporation, Highland Park, Mich., a corporation of Delaware Application August 1, 1942, Serial No. 453,164

5 Claims. (Cl. 105—453)

This application is a continuation-in-part of Janeway application Serial No. 425,273, filed January 1, 1942.

This invention relates to railway vehicles and particularly to suspension mechanism for such vehicles.

In the development of railway vehicle suspension systems, which comprise several masses and spring elements arranged in series, it has been found that the independent vibration frequencies of the several masses of the system must vary in a definite relation to each other in order to minimize transmission of intermediate vibrations into the suspended car body.

It is a fundamental principle of vibration insulation that the natural frequency of a body on an elastic mounting must be less than 70% of the disturbing frequency to insulate it from the imposed vibration. This follows from the law, $$\frac{F_t}{F_i} = \frac{1}{1 - \frac{p^2}{m^2}}$$

where $F_t$ is the transmitted force, $F_i$ is the imposed force, $m$ is the natural frequency of the body on its mounting and $p$ is the imposed vibration frequency.

It is also evident from the above equation, that the natural frequency should actually not exceed one-half of the imposed frequency if appreciable insulation is to be obtained, since this ratio is required to reduce the transmitted vibration intensity to one-third of the imposed value.

In a complex system which includes several masses and spring elements in series, each mass with its adjacent spring elements can be considered an independent vibrating system having its own natural frequency.

Applicant has found it desirable to associate a damping means with one of a series of spring means and has discovered a certain novel arrangement of damping means and springs.

An object of the present invention is to provide an improved vehicle suspension, which may incidentally be applied to a railway vehicle.

A further object is the provision of a novel association of springs, and a damping means for one or more of the springs. This arrangement may be applied to a vehicle suspension, such as that of a railway car. By the arrangement the damping means prevents the transmission of undesirable vibrations to the vehicle body and also restricts pitching oscillation which may be especially likely to occur in railway trucks.

Other objects will appear from the disclosure. Reference is now made to the drawing, in which, Fig. 1 is a side elevation of one end of a railway car, only enough of the body and truck structure being shown to make clear the principles of the present invention.

Fig. 2 is a section along line 2—2 of Fig. 1.

Fig. 3 is a similar view of a modified arrangement.

In Fig. 1, the suspension system includes three elastically supported masses, A, B and C. A is the side frame of the truck which side frame is preferably mounted on the axles 8 by means of rubber cushioning means 9. However, any equivalent resilient mounting means may be used. The axles are carried by wheels 10 in the usual manner. B designates a longitudinally disposed support member which is mounted on the side frame by means of relatively stiff coil springs 11. The mass C consists of a car body which rests on the truck bolster 12, the latter being supported on a member 12 through a relatively soft coil spring 13. It is, of course, understood that leaf springs, or other types of suspension devices, could be substituted for either or both of the spring systems 11 and 13 if desired.

The elastically supported masses A, B and C each have an independent vibration frequency, denoted respectively, by "$f_a$," "$f_b$" and "$f_c$." If the initial disturbance is applied to A, and C is the suspended mass at which vibration is to be minimized, then the limiting relation of frequencies should be $$f_a > 2f_b > 4f_c$$

or, each intermediate mass frequency should be at least twice that of the next succeeding mass nearer to the suspended mass or body.

This makes possible the progressive insulation of each vibrating mass of the system from the free vibration of the preceding mass and thus minimizes the transmission of undesirable intermediate vibrations induced within the suspension system. If, on the other hand, there should be an increase in frequency from a remote mass to one nearer the body, the vibration intensity of the latter will be amplified with consequent increase in the vibration transmitted to the body.

In applying damping to such a suspension system, it has been found most desirable to interpose the damping means between the intermediate masses, instead of across the resilient elements immediately supporting the suspended body C. This serves to reduce the intermediate mass vibration and avoids the probability of the damping means by-passing vibration or impact around the resilient element having the lowest frequency and hence, the maximum insulating effect. Furthermore, the series arrangement permits full damping control of the car body to be realized, even though the damping means is not directly connected to the body.

Accordingly, in Fig. 1, it will be seen that shock absorbers 14 are connected across the stiffer springs 11, the softer spring 13 being undamped.

By thus locating the damping members between the truck frame and the equalizer or side frame, two advantages over more conventional construction are gained. First, the snubbers 14 are spaced apart sufficiently to damped pitching oscillation of the truck frame effectively which pitching oscillation is due to the longitudinal spacing of the springs 11 and the running over rail joints successively by two wheels of a truck; secondly, the snubbers being connected across the relatively stiff springs 11, leave the softer springs 13 free to absorb impacts and prevent transmission thereof to the body C.

In this arrangement the snubbers 14 are still effective in controlling movements of the car body C due to the series arrangement of the two sets of springs. While the snubber displacement for a given body movement is reduced by the relatively higher deflection rate of the equalizer springs, this may be readily compensated for by increasing the resistance of the snubber.

Fig. 3 illustrates the application of the herein described principles to a slightly different type of truck. In the Fig. 3 forms, the equalizer side frames A support the truck frame B by means of the relatively stiff springs 11 which are damped by the snubbers 14. The body supporting truck bolster 12 is supported through the relatively soft spring 13 on a spring plank 15 which is hung on the frame B by swing links 16.

In accordance with the principles above set forth, optimum ride characteristics will be obtained in the two forms of suspensions shown when the frequency of the suspended mass B is more than twice the frequency of the mass C. Similarly, in cases where a resilient axle journal mounting is used, such as in the Fig. 1 construction, the frequency of the mass A should be more than twice that of the mass B. The more widely the frequencies of the series suspension systems differ, the more the ride is improved. In practice the spring constants and loads are preferably chosen such that the frequencies of the respective spring systems differ by at least 100%. In other words and by way of example, if the mass C has a frequency of 10 cycles per second, then the vibration frequency of the mass B should be at least 20 cycles per second and that of the mass A at least 40 cycles per second.

As previously stated, relatively stiff springs 11 are damped by shock absorbers 14 while the relatively soft spring 13 is left free and undamped. With the shock absorbers 14 as shown, any relative movement of the parts A and B toward and away from one another can occur only with an absorption of energy. Imagine the substitution of leaf springs for the coil springs 11 and the shock absorbers 14, for the action of leaf springs will illustrate by what they do not accomplish what the springs 11 and the shock absorbers 14 do accomplish. A leaf spring is considered to be a damped spring, for the friction between the leaves due to deflection involves an absorption of energy producing a damping effect. However, this occurs only with a large amount of deflection, for it is possible for a leaf spring to be deflected only a small amount without relative movement between the leaves and consequently without absorption of energy. Thus for a small deflection the leaf spring would act as a solid body, not as a shock absorber. The intermediate part B tends to vibrate at a high frequency. If a leaf spring were used between the parts A and B, it would vibrate as a solid body, not as a shock absorber, since the high frequency of vibration transmitted here would produce only a small amount of deflection. Thus, if as suggested above, leaf springs are employed in place of coil springs 11 and 13, shock absorbers 14 would still have to be provided for the leaf springs substituted for the coil springs. In contrast with the incomplete damping obtained by a leaf spring, an absorber 14 as shown causes an absorption of energy for even a small amount of deflection and thus functions for the high frequency of vibrations normally transmitted between parts A and B. There is damping for all relative movement of the parts A and B toward and away from one another.

Having thus described, for purposes of illustration, two embodiments of the invention, it is to be understood that those skilled in the art may make detail changes in the form, arrangement and construction of the associated parts without departing from the principles of the invention as set forth in the claims appended hereto.

I claim:

1. In a railway vehicle, a car body, a support member therefor, an intermediate support member, a side frame, wheels, a first elastic supporting means between the body support member and the intermediate support member, a second elastic supporting means between the intermediate support member and the said frame, a third elastic supporting means between the side frame and the wheels, the arrangement of the above being such that the natural vibrating frequency of the intermediate supporting member and the second elastic supporting means is at least twice that of the car body, the body support member, and the first elastic supporting means and is at least as small as half that of the side frame and the third supporting means on the wheels, the first elastic supporting means being relatively soft and the second elastic supporting means being relatively stiff, and damping means connected only across the relatively stiff second elastic supporting means to leave the relatively soft first elastic supporting means free to cushion impact.

2. In a vehicle, a car body, a support member therefor a first intermediate support member, a second intermediate support member, wheels, a first elastic supporting means between the body support member and the first intermediate support member, a second elastic supporting means between the first and second intermediate support members, a third elastic supporting means between the second intermediate support member and the wheels, the arrangement of the above being such that the natural vibrating frequency of the first intermediate supporting member and the second elastic supporting means is at least twice that of the car body, the body support member, and the first elastic supporting means and is at least as small as half that of the second intermediate supporting member and the wheels, one elastic supporting means being relatively soft and another elastic supporting means being relatively stiff, and damping means connected only across the relatively stiff elastic supporting means to leave the relatively soft elastic supporting means free to cushion impact.

3. In a vehicle, a body-connected member, a wheel-connected member, an intermediate support, a relatively soft spring between the intermediate support and one of the members, a pair of longitudinally spaced relatively stiff springs between the intermediate support and the other member, and a pair of longitudinally spaced dampers located adjacent the said pair of springs between the intermediate support and the said other member for damping vertical oscillations transmitted and pitching oscillations developed by virtue of the longitudinal spacing of the pair of relatively stiff springs.

4. In a railway vehicle, a car body, a support member therefor, an intermediate support member, a relatively soft spring between said members for supporting the body support member on the intermediate support member, a side frame, a pair of longitudinally spaced relatively stiff springs between said frame and intermediate support member for supporting said intermediate support member on said frame, and a pair of longitudinally spaced dampers located adjacent the said pair of springs between the side frame and the intermediate support member for damping vertical oscillations transmitted to the intermediate support member and pitching oscillations developed by virtue of the longitudinal spacing of the pair of relatively stiff springs.

5. In a vehicle, a body-connected member, a wheel-connected member, an intermediate supporting member, a spring means free of damping between the intermediate supporting member and one of the two first mentioned members, a coil spring means between the intermediate supporting member and the other of the two first mentioned members, the coil spring means being relatively stiff and the other spring means being relatively soft, and damping means independent of and connected in parallel with the coil spring means to absorb energy upon all relative movement of the members toward and away from one another between which the coil spring means is connected and to leave the other spring means free to cushion impact.

ROBERT N. JANEWAY.

CERTIFICATE OF CORRECTION.

September 18, 1945.

Patent No. 2,384,925.

ROBERT N. JANEWAY.

It is hereby certified that error appears in the printed specification of the above numbered patent requiring correction as follows: Page 2, first column, line 18, for "damped" read --dampen--; and that the said Letters Patent should be read with this correction therein that the same may conform to the record of the case in the Patent Office.

Signed and sealed this 1st day of January, A. D. 1946.

Leslie Frazer

First Assistant Commissioner of Patents.

(Seal)

wheels, one elastic supporting means being relatively soft and another elastic supporting means being relatively stiff, and damping means connected only across the relatively stiff elastic supporting means to leave the relatively soft elastic supporting means free to cushion impact.

3. In a vehicle, a body-connected member, a wheel-connected member, an intermediate support, a relatively soft spring between the intermediate support and one of the members, a pair of longitudinally spaced relatively stiff springs between the intermediate support and the other member, and a pair of longitudinally spaced dampers located adjacent the said pair of springs between the intermediate support and the said other member for damping vertical oscillations transmitted and pitching oscillations developed by virtue of the longitudinal spacing of the pair of relatively stiff springs.

4. In a railway vehicle, a car body, a support member therefor, an intermediate support member, a relatively soft spring between said members for supporting the body support member on the intermediate support member, a side frame, a pair of longitudinally spaced relatively stiff springs between said frame and intermediate support member for supporting said intermediate support member on said frame, and a pair of longitudinally spaced dampers located adjacent the said pair of springs between the side frame and the intermediate support member for damping vertical oscillations transmitted to the intermediate support member and pitching oscillations developed by virtue of the longitudinal spacing of the pair of relatively stiff springs.

5. In a vehicle, a body-connected member, a wheel-connected member, an intermediate supporting member, a spring means free of damping between the intermediate supporting member and one of the two first mentioned members, a coil spring means between the intermediate supporting member and the other of the two first mentioned members, the coil spring means being relatively stiff and the other spring means being relatively soft, and damping means independent of and connected in parallel with the coil spring means to absorb energy upon all relative movement of the members toward and away from one another between which the coil spring means is connected and to leave the other spring means free to cushion impact.

ROBERT N. JANEWAY.

CERTIFICATE OF CORRECTION.

Patent No. 2,384,925.    September 18, 1945.

ROBERT N. JANEWAY.

It is hereby certified that error appears in the printed specification of the above numbered patent requiring correction as follows: Page 2, first column, line 18, for "damped" read --dampen--; and that the said Letters Patent should be read with this correction therein that the same may conform to the record of the case in the Patent Office.

Signed and sealed this 1st day of January, A. D. 1946.

Leslie Frazer

First Assistant Commissioner of Patents.

(Seal)